United States Patent [19]

Kimoto et al.

[11] Patent Number: 5,395,403
[45] Date of Patent: Mar. 7, 1995

[54] HYDROGEN-ABSORBING ALLOY ELECTRODE AND MANUFACTURING METHOD THEREFOR

[75] Inventors: Mamoru Kimoto; Shinya Inoue; Masao Takee; Fusago Mizutaki; Koji Nishio; Motoo Tadokoro; yoshito Chikano; Yoshinori Matsuura; Nobuhiro Furukawa, all of Osaka, Japan

[73] Assignee: Sanyo Electric Co., Ltd., Osaka, Japan

[21] Appl. No.: 84,294

[22] Filed: Jun. 28, 1993

[30] Foreign Application Priority Data

Jun. 30, 1992 [JP] Japan .................. 4-173308
Dec. 17, 1992 [JP] Japan .................. 4-355881

[51] Int. Cl.⁶ .................................. H01M 4/04
[52] U.S. Cl. ....................... 29/623.5; 427/201; 427/352; 427/353; 429/217
[58] Field of Search ............... 427/201, 352, 353; 29/623.5; 429/59, 217, 101

[56] References Cited

U.S. PATENT DOCUMENTS

| | | | |
|---|---|---|---|
| 2,983,960 | 5/1961 | Jilge | 427/353 X |
| 4,279,709 | 7/1981 | McIntyre et al. | 427/352 X |
| 4,331,734 | 5/1982 | Stegmeier | 427/352 X |
| 4,994,334 | 2/1991 | Ikoma et al. | 429/59 X |
| 5,053,292 | 10/1991 | Hasebe et al. | 429/101 |
| 5,100,747 | 3/1992 | Hayashida et al. | 429/101 |
| 5,102,702 | 4/1992 | Grundke et al. | 427/352 X |

FOREIGN PATENT DOCUMENTS 4-62753 2/1992 Japan.

*Primary Examiner*—Stephen Kalafut
*Attorney, Agent, or Firm*—Spensley Horn Jubas & Lubitz

[57] ABSTRACT

A hydrogen-absorbing alloy electrode comprises a conductive substrate, a layer of hydrogen-absorbing alloy granules disposed on the conductive substrate and a binder for binding the granules together and to the conductive substrate. A part of the granules is exposed on a surface of the layer on the electrode. The layer may have a predetermined thickness and the granules may include large size granules having a maximum diameter larger than half the thickness of the layer but smaller than the thickness of the layer. The granules may include first granules having a first average diameter and second granules having a second average diameter smaller than the first average diameter; the first granules may be 5 wt % or more but less than 20 wt % of the total weight of the granules.

18 Claims, 13 Drawing Sheets

HYDROGEN-ABSORBING ALLOY ELECTRODE AND MANUFACTURING METHOD THEREFOR

BACKGROUND OF THE INVENTION

1. Field of the Invention

This invention relates to a hydrogen-absorbing alloy electrode in an alkaline storage battery and to a method for manufacturing such an electrode.

2. Description of the Prior Art

Alkaline storage batteries, such as Ni-Cd batteries, and lead acid batteries, are well-known. Currently, lighter and larger capacity batteries with high energy density are needed. Therefore, metal hydride storage batteries, which utilize a hydrogen-absorbing alloy to reversibly absorb and desorb hydrogen as a negative electrode, would appear to be advantageous.

In a hydrogen-absorbing alloy electrode for an alkaline storage battery, hydrogen-absorbing alloy granules are mixed with a powdery binder to form the electrode. The surface of the electrode is covered with a thin film composed of the binder with low oxygen permeability.

One of an important characteristics of the metal hydride storage battery is rapid charging characteristics. When charging is terminated in a short time using high rate current, that is, when the battery is rapidly charged, the utility of the positive electrode decreases. As a result, oxygen gas is generated at the positive electrode. The oxygen is consumed by reacting with hydrogen in the hydrogen-absorbing alloy. Since the surface of the negative electrode is covered with a thin film composed of the binder, having a low permeability of the oxygen gas, the negative electrode is inferior to oxygen gas absorption characteristics. Because the oxygen gas consumption reaction does not proceed rapidly enough, the internal pressure of a battery equipped with such a negative electrode increases.

On the other hand, on manufacturing the hydrogen-absorbing alloy, each component of the alloy is measured and mixed in a fixed ratio, melted in an arc furnace with an inert argon atmosphere and then cooled to obtain a hydrogen-absorbing alloy bulk. To complete a negative electrode, the hydrogen-absorbing alloys are mechanically pulverized into granules. The granules are then kneaded into a paste with powdered polytetrafluorethylene (PTFE), which acts as a binder. The paste is coated onto a conductive substrate, as a current collector, comprising a punched metal plate.

SUMMARY OF THE INVENTION

A primary object of the present invention is to improve the oxygen consumption characteristics of a hydrogen-absorbing alloy electrode for a negative electrode.

Another object of the present invention is to provide a hydrogen-absorbing alloy electrode with increased cycle characteristics.

A further object of the present invention is to provide a hydrogen-absorbing alloy electrode which reduces the internal pressure in a battery in which the electrode is used.

An object of the present invention is to provide a hydrogen-absorbing alloy electrode with excellent rapid charging characteristics.

The above objectives are fulfilled by a hydrogen-absorbing alloy for a negative electrode comprising a conductive substrate, a layer of hydrogen-absorbing alloy granules disposed on the conductive substrate and a binder for binding the granules together and to the conductive substrate. A part of the granules is exposed on a surface of the layer.

The layer has a predetermined thickness and the granules may include large size granules having a maximum diameter larger than half the thickness of the layer but smaller than the thickness of the layer. The granules may also include first granules having a first average diameter and second granules having a second average diameter smaller than the first diameter, the first granules may be about 5 wt % or more but less than about 20 wt % of the total weight of the granules.

The above objectives may also be fulfilled by a method of manufacturing a hydrogen-absorbing alloy for a negative electrode comprising the steps of mixing hydrogen-absorbing alloy granules with a binder to form a layer, coating the layer onto a conductive substrate to produce an electrode plate and removing a part of the binder from a surface of the electrode plate to expose a part of the granules in the surface to an electrolyte.

The binder may include an organic soluble material, and the binder adjacent to the surface may be removed by an organic solvent. Also, the binder may include a water soluble material, the binder adjacent to the surface being removed by water which may include an organic material for dissolving the binder.

The water soluble material may be selected from a group consisting of polyethylene oxide (PEO), polyvinyl pyrrolidone (PVP), polyvinyl alcohol (PVA), polyvinyl butyral (PVB) and hydroxypropyl cellulose (HPC). The organic material may be selected from a group consisting of amine, ketone, fatty acid, ether and alcohol, in an amount ranging from about 0.1 wt % to about 20 wt %.

Further, the above objectives may be fulfilled by a method of manufacturing a hydrogen-absorbing alloy electrode comprising the steps of mixing hydrogen-absorbing alloy granules with a binder to form a layer, the binder including one type of photo resist, coating the layer onto a conductive substrate to provide an electrode plate, irradiating the electrode plate by ultraviolet radiation and removing a part of the binder from a surface of said electrode plate to expose a part of the granules in the surface to an electrolyte.

In this method, the binder may be defined by a positive type photoresist and a negative type photoresist. The binder may include 100% of either type of photoresist.

The removing step may be carried out by means of a dry ashing method or by a developer for the one type of photoresist. An amount ranging from about 20 wt % to about 80 wt % of the one type of photoresist may remain in the layer after the removing step.

In the above methods, the layer has a predetermined thickness and the granules may include large size granules having a maximum diameter larger than half the thickness of the layer but smaller than the thickness of the layer.

BRIEF DESCRIPTION OF THE DRAWINGS

These and other objectives, advantages and features of the invention will become apparent from the following detailed description taken in conjunction with the accompanying drawings that illustrate specific embodiments of the invention. In the drawings.

DETAILED DESCRIPTION OF THE PREFERRED EMBODIMENT

The following detailed description is of the best presently contemplated mode of carrying out the invention. This description is not to be taken in a limiting sense, but is made merely for the purpose of illustrating general principles and embodiments of the invention. The scope of the invention is defined by the appended claims.

First Experiment

In accordance with a first experiment, small portions of a hydrogen-absorbing alloy electrode surface may be covered with remaining binder. However, a hydrogen-absorbing alloy readily reacts with oxygen gas generated from a positive electrode. As a result, the oxygen gas is consumed on the electrode surface, and such consumption facilitates a recombination between oxygen and hydrogen. Further, the electrode surface can freely contact an electrolyte. The negative electrode reaction is improved; thus, the cycle life of the negative electrode can be increased.

{First Embodiment 1—1}

Figure 1:
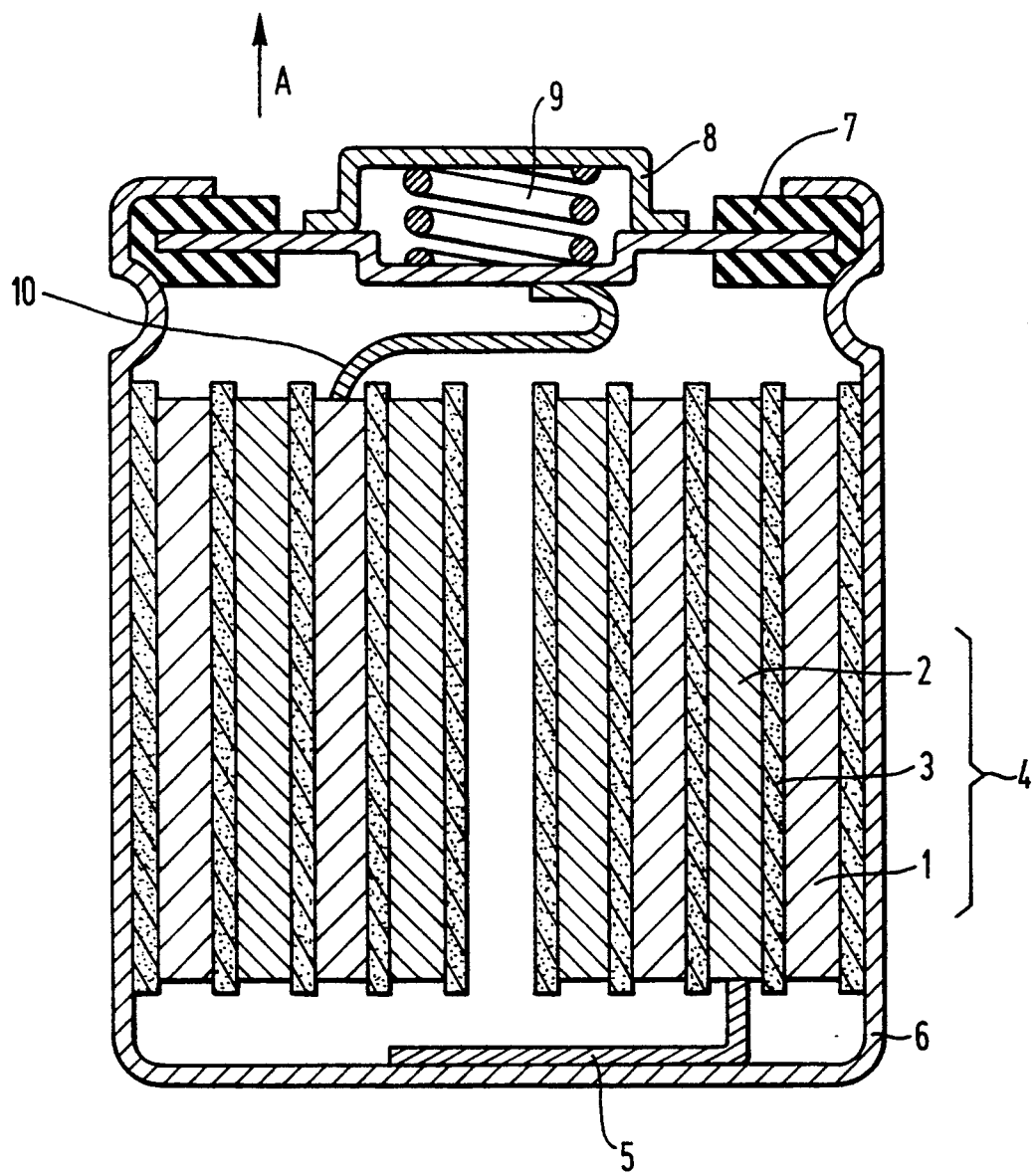
FIG. 1 is a cross-section of a battery equipped with the hydrogen-absorbing alloy electrode of the present invention.

FIG. 1 is a cross-section of a cylindrical type metal hydride storage battery equipped with a hydrogen-absorbing alloy electrode of the present invention. In FIG. 1, a positive electrode 1 of the sintered type, a hydrogen-absorbing alloy negative electrode 2 according to the present invention and a separator 3, which is disposed between the negative electrode 2 and the positive electrode 1, are wound spirally, and compose an electrode body 4. The electrode body 4 is housed within an outer case 6 acting as a negative terminal. The negative electrode 2 is electrically connected to the outer case 6 by a negative lead 5. The outer case 6 is sealed by a cap 8 through an insulating packing 7. The cap 8 is equipped with a safety valve. In the cap 8, a coil spring 9 is provided. When the internal pressure of the battery increases, the coil spring 9 is pressed in the direction "A" and compressed and gas in the battery can be released through the safety valve. The cap 8 is electrically connected to the positive electrode 1 by a positive lead 10.

The above battery is made as follows. First, Mm (so-called "Misch metal", a mixture of rare-earth elements), nickel (Ni), cobalt (Co), manganese (Mn) and aluminum (Al) are measured and mixed in a ratio of 1:3.2:1:0.6:0.2. These constituents are melted in a high frequency furnace using argon atmosphere to obtain a melt and the melt is cooled, thereby producing a hydrogen-absorbing alloy bulk. The alloy is represented by the formula $MmNi_{3.2}CoMn_{0.6}Al_{0.2}$. The hydrogen-absorbing alloy bulk is crushed and classified into granules of 50 $\mu$m average size. Next, the granules are kneaded into a paste with polyethyleneoxide (PEO) as a binder. The paste is coated onto both sides of a punched metal conductive substrate, thereby forming an electrode plate. The hydrogen-absorbing alloy granules are combined and covered with the binder so that the electrode plate surface has a thin film of binder. Then, the electrode plate is sprayed with steam. By this treatment, the binder of the surface is decomposed, and the binder is removed from the electrode plate surface. As a result, surface portions of the hydrogen-absorbing alloy granules on the electrode plate are exposed. The surface portions of the hydrogen-absorbing alloy granules may thereby be easily contacted by oxygen gas. The typical conditions of the steam spray are: a conductive substrate temperature is kept below 70° C., and the spray steam volume is set under 1 cc/cm$^2$ of water. After spraying with the steam, the electrode plate is dried by far infrared heating, thereby producing the hydrogen-absorbing alloy negative electrode 2. On drying, the conductive substrate temperature is kept below 70° C., and the conductive substrate is moved at a speed ranging from 0.3 m/min to 1.5 m/min.

Finally, the negative electrode 2 is combined with a sintered type nickel electrode 1 and a separator 3 in order to form a wound electrode body 4. The electrode body 4 is inserted into an outer case 6, and an alkaline electrolyte of 30 wt % KOH, is poured into the outer case 6. Then, the outer case 6 is sealed by the cap, whereby the metal hydride storage battery of cylindrical type is obtained. A battery comprising embodiment "A1" of the present invention is thus prepared.

{Second Embodiment 1—2}

The differences between the first embodiment 1—1 and a second embodiment 1—2 are explained below. Hydrogen-absorbing alloy granules, prepared in the same way as in the first embodiment 1—1, are mixed with a positive type photoresist as a binder to obtain a paste. The positive type photoresist is, for example, sold by Hoechst Celanese Corporation and composed of a mixture of novolac resin and O-quinone diazido. The viscosity of the paste ranges from about 100 cp to about 115 cp. The paste is coated onto both sides of the conductive substrate so as to provide an electrode plate. The electrode plate is dried at 85° C. for 15 minutes to remove the solvent from the binder. The electrode plate is exposed by a mercury-vapor lamp. Typical conditions are as follows:

ultraviolet ranging from 325 $\mu$m to 450 $\mu$m, illuminance power ranging from 200 W/m$^2$ to 800 W/m$^2$ and exposing time ranging from 15 seconds to 60 seconds. After exposing, the electrode plate is developed in a developer of AZ-developer by dipping for 1 minute.

During the above treatments, the photoresist of the electrode surface is removed; however, the inner part of the photoresist of the electrode remains. During exposure, the photoresist of the electrode surface is irradiated by the ultraviolet; however, the inner part of the photoresist is not irradiated because of the hydrogen-absorbing alloy placed on the surface which acts as a photomask. Therefore, the inner part of the photoresist is retained, the hydrogen-absorbing alloy is held in the negative electrode, and is prevented from falling off during manufacturing.

After developing, the electrode plate is rinsed with water, dried, and baked at 115° C. for 15 minutes. By this baking, adhesion between the hydrogen-absorbing granules and between the hydrogen-absorbing alloy granules and the conductive substrate improves. In this way, a negative electrode is prepared following which a battery of the second embodiment 1—2 is produced in the same way as the first embodiment 1—1. This embodiment is identified as battery "A2".

{Third Embodiment 1—3}

The differences between the first embodiment 1—1 and a third embodiment 1—3 are explained below. Hydrogen-absorbing alloy granules, prepared in the same way as in the first embodiment 1—1, are mixed with a positive type photoresist as a binder to obtain a paste. The positive type photoresist is soluble in organic solvents. The viscosity of the paste ranges from about 100 cp to about 115 cp. The paste is coated onto both sides of the conductive substrate to obtain an electrode plate. The electrode plate is baked at 115° C. for 15 minutes to remove the binder solvent. The electrode plate, as a negative electrode, is wound with a positive electrode and a separator to form an electrode body of a spiral type. The electrode body is immersed in acetone to dissolve the binder and then dried. In this state, the 80% binder (photoresist) is removed. The binder is almost removed, the hydrogen-absorbing alloy granules are held by the positive electrode, the conductive substrate and also the separator. Therefore, in the negative electrode the hydrogen-absorbing alloy granules are prevented from falling off during manufacturing.

After removing the binder, the electrode body is prepared, and inserted into an outer case thus forming a battery of the third embodiment 1—3. This battery may be called embodiment "A3" of the present invention.

{Comparative Example}

The differences between the first embodiment 1—1 and a comparative example are set forth below. The spraying steam treatment is not carried out in the comparative example, and then, an electrode plate is prepared and used as a negative electrode. A battery equipped with the negative electrode of the comparative example is produced in the same way as in the first embodiment 1—1. The battery of the comparative example is called "X". On the surface of the negative electrode, the binder remains; therefore, the surface is covered with a thin film of the binder.

TEST 1—1

Figure 2:
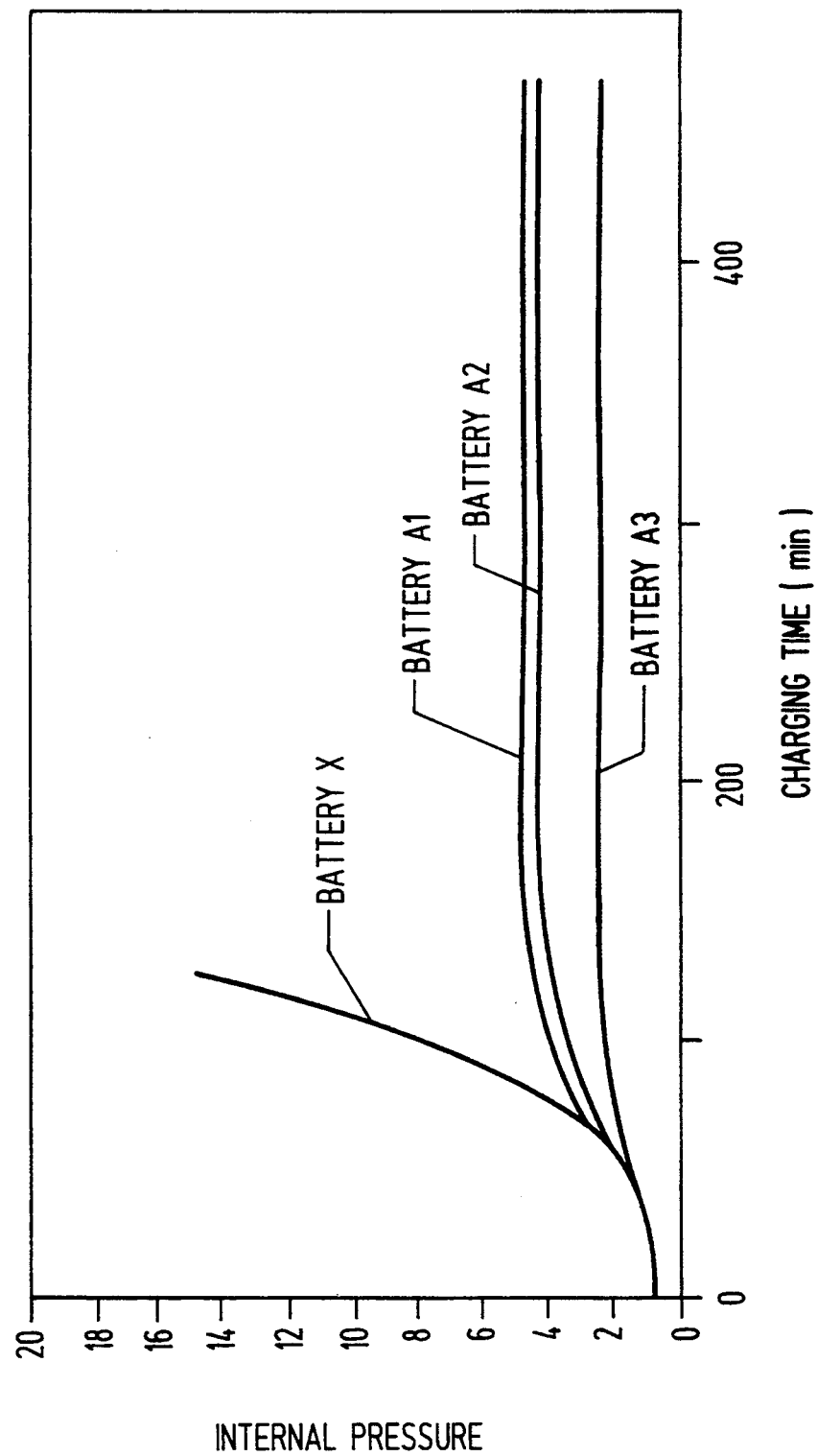
FIG. 2 is a graph showing a relationship between charging time and internal pressure in a battery of the present invention.

In TEST 1—1, the charging times and internal pressures of the batteries "A1", "A2", "A3" and "X" were determined. Typical test of the research are shown in FIG. 2. The internal pressure of the battery is measured continuously by charging at 1 C rate. According to FIG. 2, the batteries "A1", "A2" and "A3" prevent the internal pressure from increasing compared to the battery "X" of the comparative example. As to the capacity of oxygen consumption characteristics of the negative electrode, the battery "A3" is remarkably improved.

TEST 1—2

Figure 3:
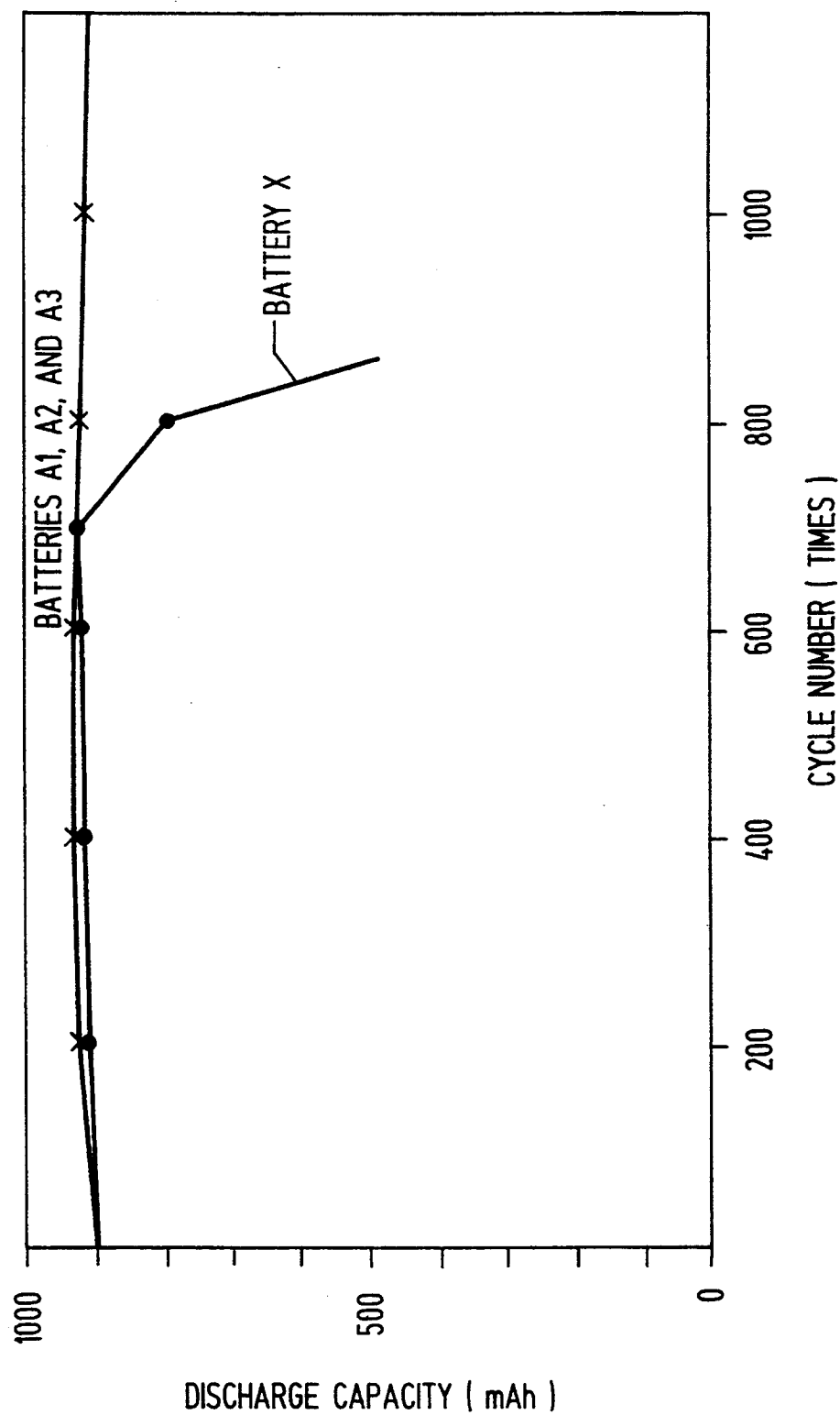
FIG. 3 is a graph showing a relationship between cycle numbers and a discharge capacity of the battery of the present invention.

In TEST 1—2, the cycle characteristics of the batteries "A1", "A2", "A3" and "X" were determined Typical results of the test are shown in FIG. 3. In FIG. 3, the horizontal axis represents cycle times and the vertical axis represents discharge capacity of the battery. Typical conditions are set to charge at 1 C rate for 1.2 hours and to discharge at 2 C rate to 1.0 V battery voltage. According to FIG. 3, the batteries "A1", "A2" and "A3" have excellent cycle characteristics as compared to the battery "X" of the comparative example.

In the first embodiment 1—1, polyethylene oxide (PEO) is used as a water soluble binder, but polyvinyl alcohol (PVA), polyvinyl pyrrolidone (PVP) and polyvinyl butyral (PVB) may be used. Before the steam spraying treatment, an infrared-drying process for the paste can be used.

In the second embodiment 1—2 and the third embodiment 1—3, positive type photoresists are used; a mixture of phenol resin and azido may also be used. Further, a negative type photoresist can also be used for the positive type photoresist.

In the third embodiment 1—3, after preparing the electrode body 4, by immersing the electrode body 4 into acetone, the photoresist may be removed. And also, for a removing method of the photoresist, dry ashing method may be used. The dry ashing method uses RF plasma (13.56 MHz); the photoresist is thereby decomposed into $H_2O$ and $CO_2$.

As to the removing methods of the photoresist for the binder on a surface of the negative electrode, the method is not limited in the second embodiment 1—2. By using a roller impregnated with an organic solvent, the photoresist can be removed.

In the third embodiment 1—3 acetone is used as the solvent, but solvents including ketone or cellosolveacetate may be used. The amount of the photoresist removed can be set, ranging from about 20% to about 80% of the initial amount of the photoresist. When the amount of photoresist is removed less than about 20%, the advantages of the invention are not sufficiently obtained. The other hand, removing more than about 80% causes shedding off of the hydrogen-absorbing alloy granules. In order to control the amount of photoresist removal, the immerse on time of the electrode body in a solvent may be regulated.

Second Experiment

In a second experiment, after a thin film of a binder is formed on an electrode surface, the thin film is dissolved and removed by spraying with steam including an organic material. In this method, the organic material is added as a dissolution accelerant into the steam, and the thin film of the binder is quickly dissolved.

As for the organic material, amines (ethylene diamine), ketones (acetone, methylethyl ketone), fatty acids (acetic acid), ethers (diethyl ether) and alcohols (ethanol, propanol, butanol) may be used. The organic materials can effectively dissolve the thin film of the binder by adding such materials to the steam, and various mixture of the organic materials may be used.

The amount of the organic materials depends on the kind of binder. The kind of the organic materials and the thickness of the thin film depend upon the kind of binder, and the amount of the organic materials is set to range from about 0.1 parts weight to about 20 parts weight per 100 parts weight of water.

As for a hydrogen-absorbing alloy, rare-earth hydrogen-absorbing alloy systems (LaNi$_5$, LaNi$_3$Co$_2$, partial replacement them, MmNi$_5$, MmNi$_3$Co$_2$), Ti-Ni hydrogen-absorbing alloy systems (Ti$_2$Ni, TiNi$_2$ and partial replacement of a part of nickel for cobalt, manganese or aluminum), Ti-Mn hydrogen-absorbing alloy systems, Ti-Fe hydrogen-absorbing alloy systems, Mg-Ni hydrogen-absorbing alloy systems, Ti-Zr hydrogen absorbing alloy systems and Zr-Mn hydrogen-absorbing alloy systems may be used.

As for the binder of the present invention, resins with softening temperatures below 250° C. may be used. For example, polyethylene oxide (PEO), polyvinyl pyrrolidone (PVP), polyvinyl alcohol (PVA), polyvinyl butyral (PVB) and hydroxypropyl cellulose (HPC) may be used.

{First Embodiment 2—1}

First, Mm (Misch metal), nickel (Ni), cobalt (Co), aluminum (Al) and manganese (Mn) are measured and mixed in a ratio of 1:3.2:1:0.6:0.2. They are melted in a high frequency furnace under an inert (argon) atmosphere, and cooled by a single roll process, then a hydrogen-absorbing alloy bulk is obtained. The hydrogen-absorbing alloy is represented by the formula MmNi$_{3.2}$CoMn$_{0.6}$Al$_{0.2}$. The hydrogen-absorbing alloy bulk is crushed and classified into granules of 50 μm average size. Next, the granules are kneaded into a paste with polyethyleneoxide (PEO) as a binder at a 100:1 ratio. The paste is coated onto both sides of a punched nickel metal plate as a conductive substrate, and dried, whereby an electrode plate is formed. On the electrode plate, the hydrogen-absorbing alloy granules are combined and covered with the binder; the electrode plate surface has a thin film of a PEO binder. Then, the electrode plate is treated by spraying with steam including ethanol as an organic material. A ratio of water and the ethanol is set at 100 parts weight and 5 parts weight. The binder of the electrode surface is thereby decomposed, and the binder is removed form the electrode surface. As a result, hydrogen-absorbing alloy granules on the electrode surface are no longer covered by the binder and a part of the hydrogen-absorbing alloy granules can make easy contact with oxygen gas; an electrode identified a "E1" is thereby produced.

Figure 4:
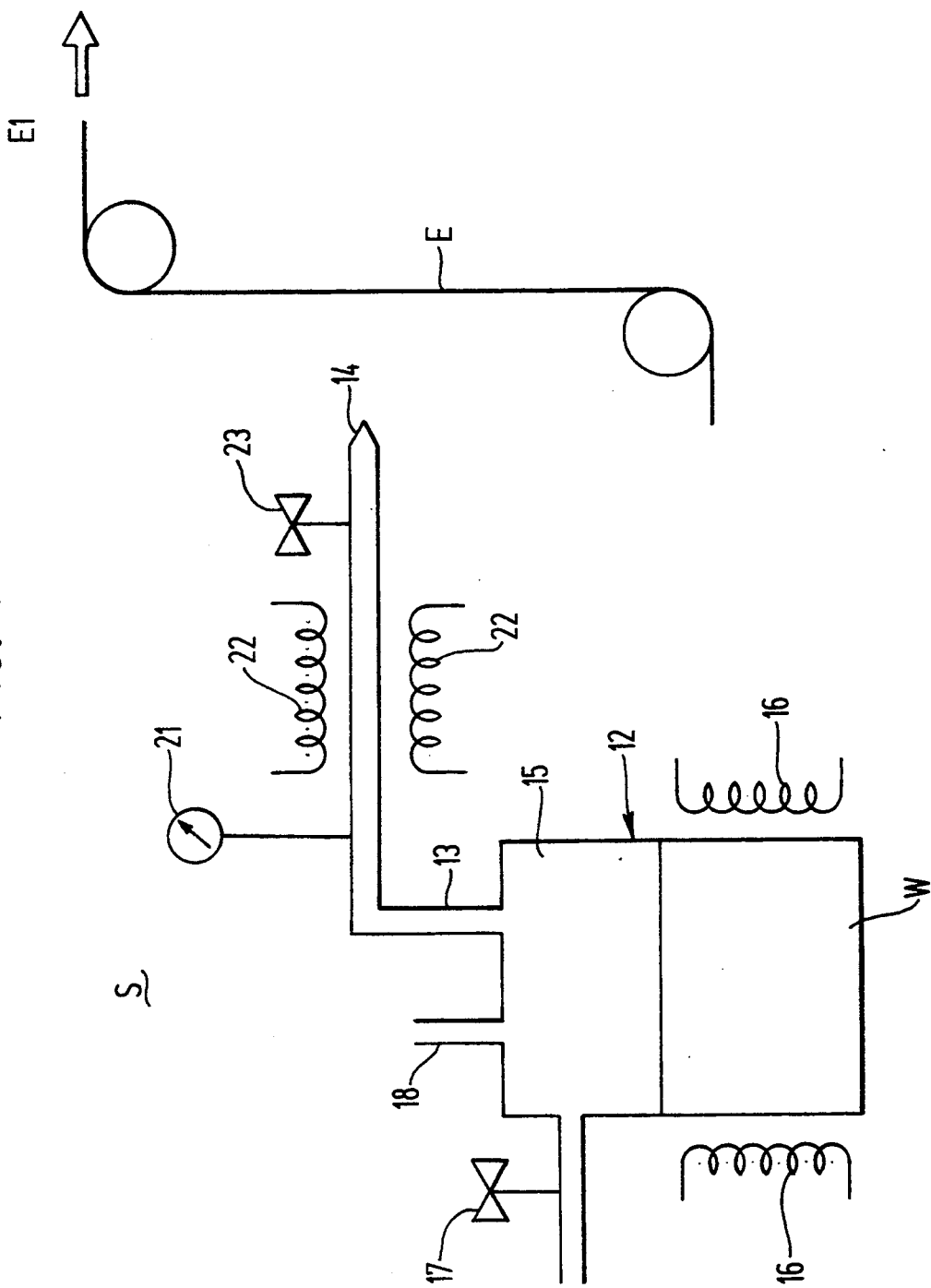
FIG. 4 is a schematic representation of a manufacturing method in accordance with the present invention.
Figure 5:
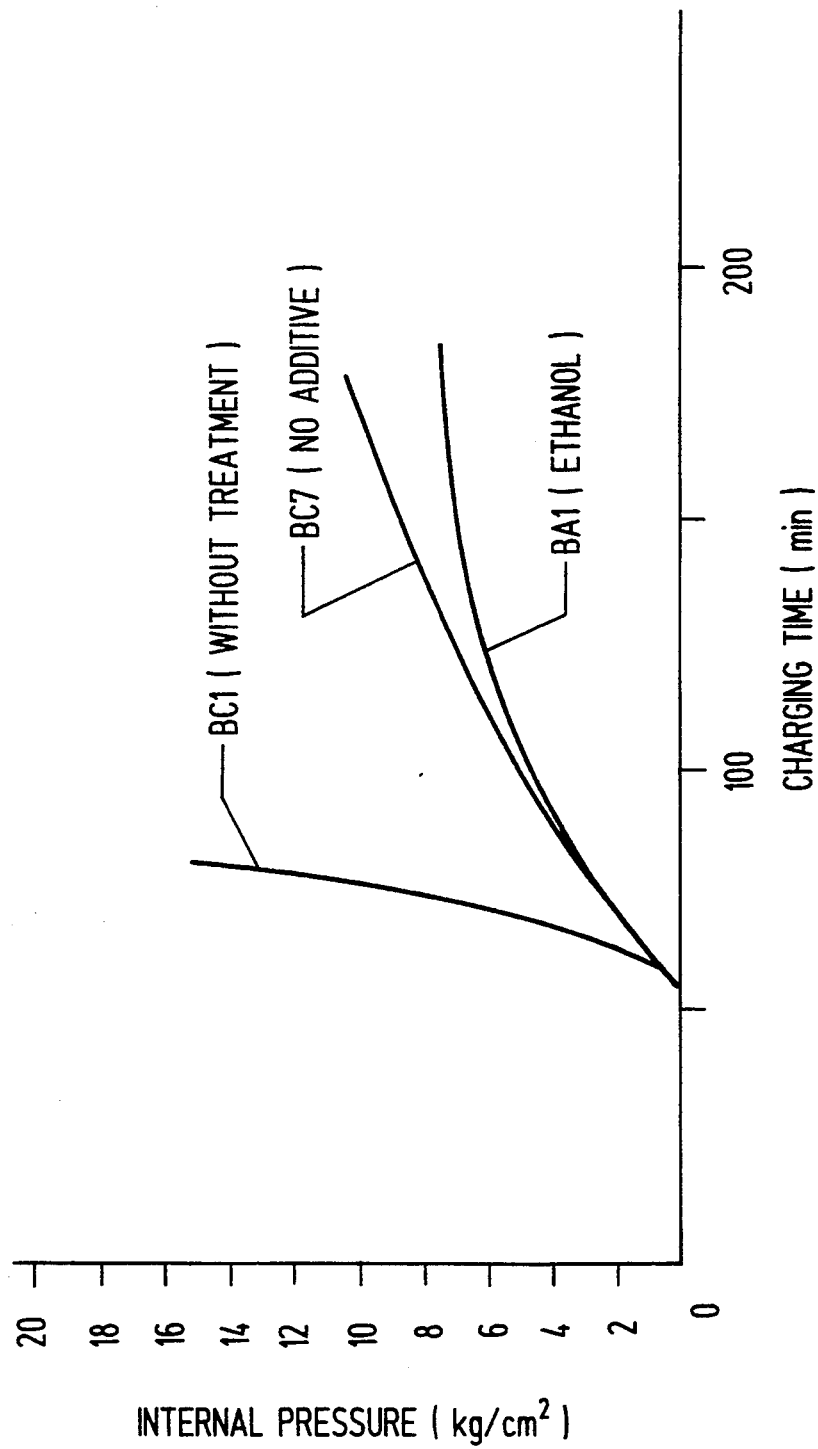
FIGS. 5–10 are graphs showing the relationship between the charging time and the internal pressure of a battery of the present invention.
Figure 6:
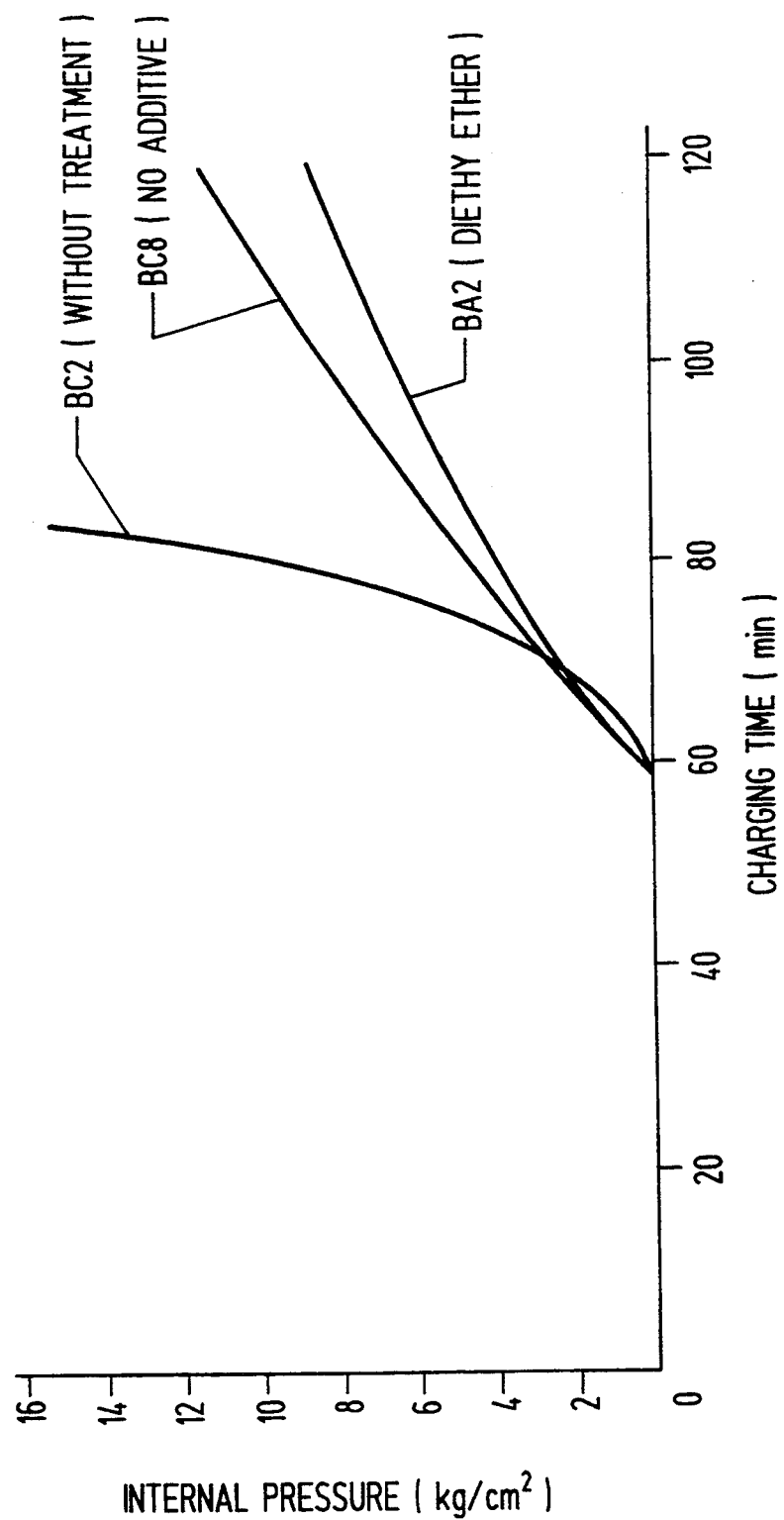
Figure 7:
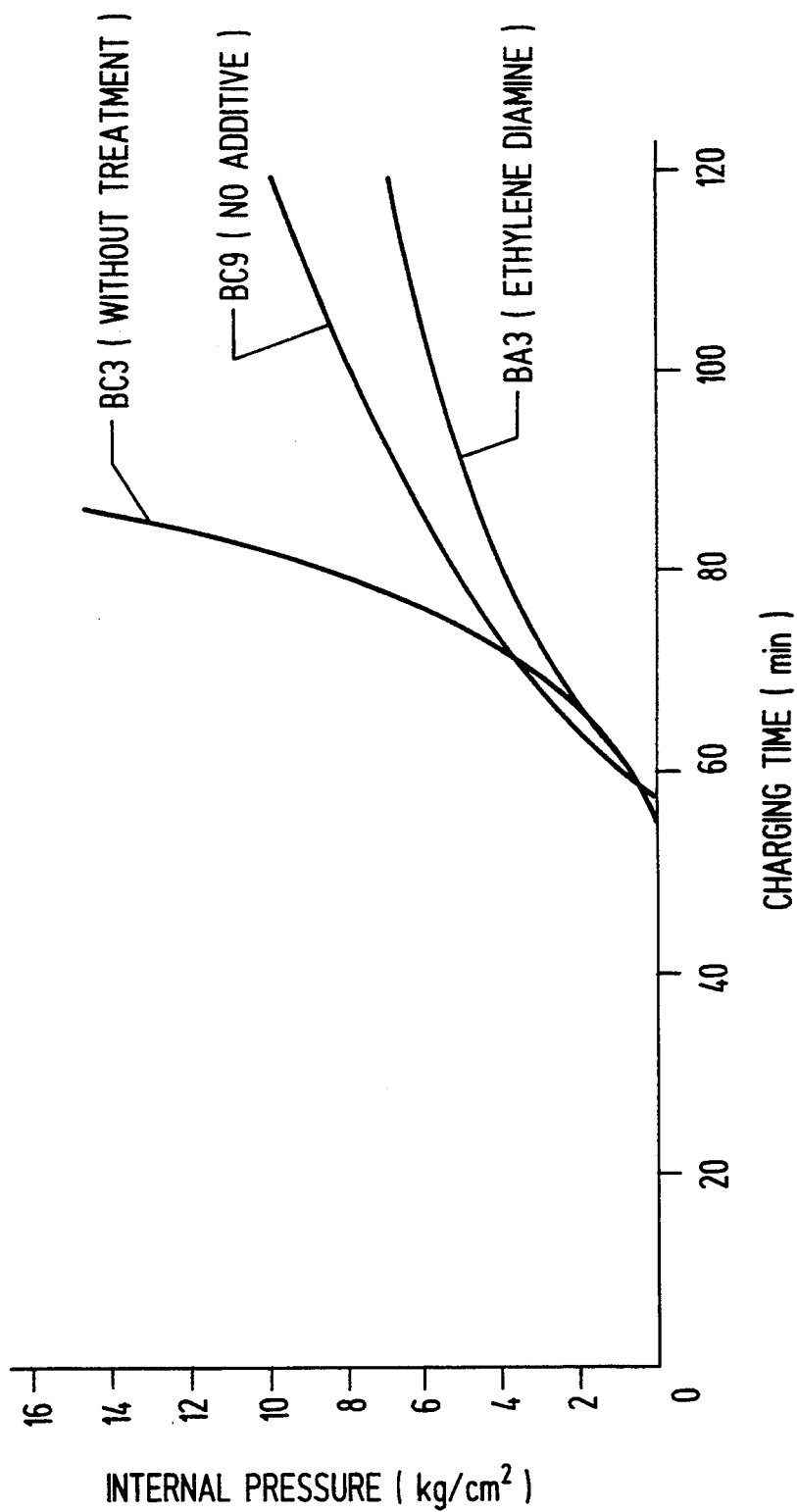
Figure 8:
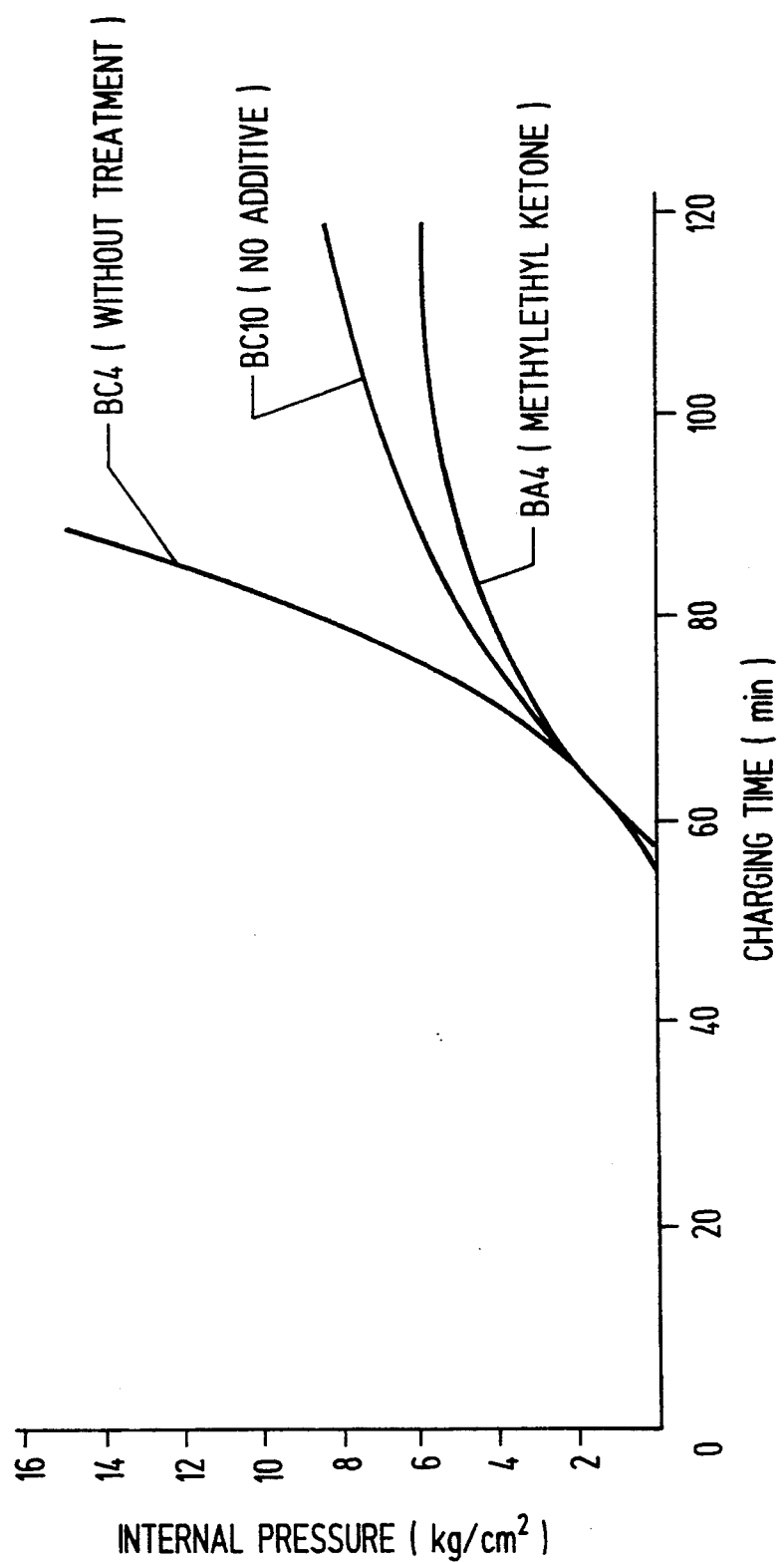
Figure 9:
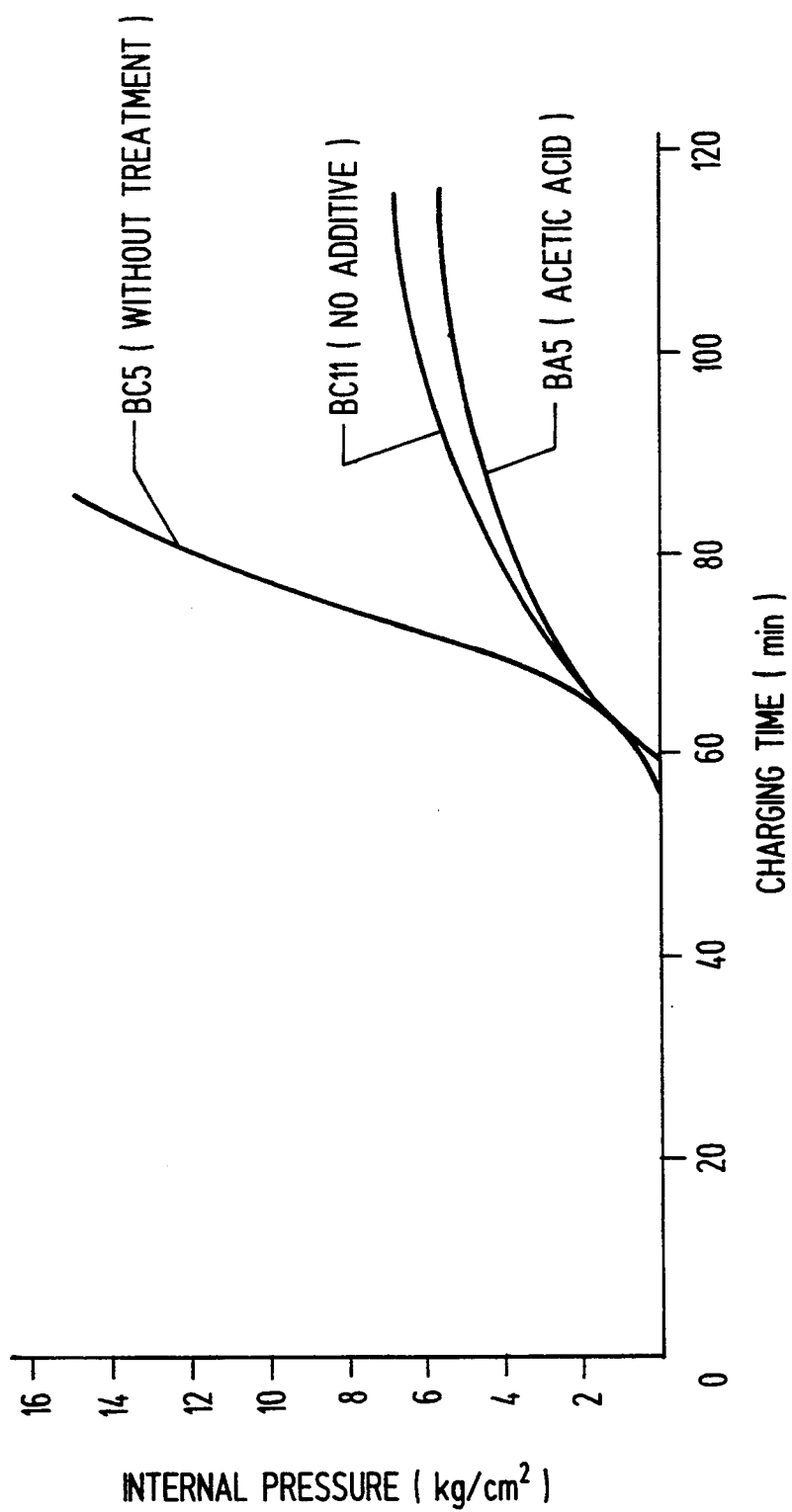
Figure 10:
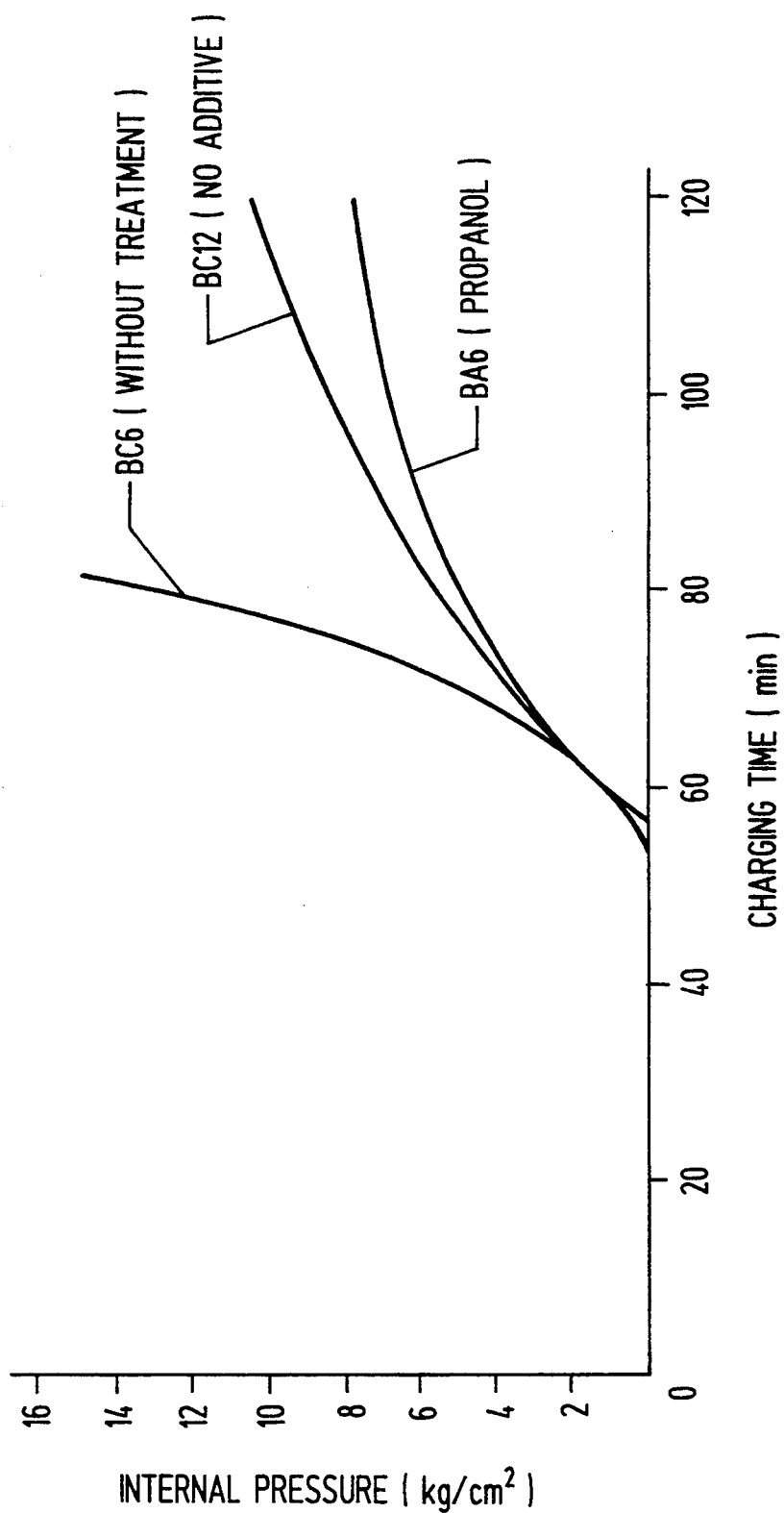

FIG. 4 is a process illustration of the present invention. A steam treatment system "S" has a steam generating tank 12, a steam supplying pipe 13 and a nozzle 14. The steam generating tank 12 includes steam treatment liquid "W" composed of a mixture of water and ethanol. A space 15 in the tank 12 comprises a steam generating space above the steam treatment liquid "W". In the steam generating tank 12, side walls are equipped with heaters 16 facing a part of the steam treatment liquid "W". The heaters 16 heat up the steam treatment liquid "W" to generate the steam. One of the side walls has a safety valve 17 for releasing excessive internal pressure. Along upper the margin of the steam generating space 15, a supply pipe 18 and a steam supply pipe 13 are mounted. The supply pipe 18 supplies the steam treatment liquid "W" heated at about 60° C. for the steam generating tank 12. The steam supply pipe 13 produces the steam from the steam generating space 15. A tapered portion of the steam supply pipe 13 forms a nozzle 14. The steam supply pipe 13 has a pressure gage 21, pre-heaters 22 for preventing condensation and a pressure regulating valve 23. In the above steam treatment system "S", steam is generated by heating the steam treatment liquid "W" in the steam generating tank 12; the steam is discharged from the nozzle 14. As a result, the steam impinges upon a surface of the electrode plate to form the electrode E1. Then, the binder on the surface of the electrode plate "E" is dissolved and removed. There is no limitation as to the shape of the nozzle 14.

{Second Embodiment 2—2}

In a second embodiment 2—2, a steam treatment liquid comprising a mixture of water (100 parts weight) and diethylether (5 parts weight) is used. Except for the steam treatment liquid, the conditions are the same as in the first embodiment 2—1. In the second embodiment 2—2, a treated electrode "E2" of the present invention is produced.

{Third Embodiment 2—3}

In a third embodiment 2—3, a steam treatment liquid comprising a mixture of water (100 parts weight) and ethylene diamine (5 parts weight) is used. Except for the steam treatment liquid, the conditions are the same as in the first embodiment 2—1. In the third embodiment 2—3, a treated electrode "E3" of the present invention is produced.

{Fourth Embodiment 2—4}

In a fourth embodiment 2—4, a steam treatment liquid comprising a mixture of water (100 parts weight) and methylethyl ketone (5 parts weight) is used. Except for the steam treatment liquid, the conditions are the same as in the first embodiment 2—1. In the fourth embodiment 2—4, a treated electrode "E4" of the present invention is produced.

{Fifth Embodiment 2—5}

In a fifth embodiment 2—5, a steam treatment liquid comprising a mixture of water (100 parts weight) and acetic acid (5 parts weight) is used. Except the steam treatment liquid, the conditions are the same as in the first embodiment 2—1. In the fifth embodiment 2—5, a treated electrode "E5" of the present invention is produced.

{Sixth Embodiment 2—6}

In a sixth embodiment 2—6, a steam treatment liquid comprising a mixture of water (100 parts weight) and propanol (5 parts weight) is used. Except the steam treatment liquid, the conditions are the same as in the first embodiment 2—1. In the sixth embodiment 2—6, a treated electrode "E6" of the present invention is produced.

{Comparative Examples}

In each embodiment, non-treated electrodes (without the above-described steam spraying) including an organic material were prepared, and identified as "CE1", "CE2", "CE3", "CE4", "CE5" and "CE6", respectively. Further, in each embodiment, electrodes treated with water steam and without any organic mate rials (no additive) were prepared, and identified as "CE7", "CE8", "CE9", "CE10", "CE11" and "CE12", respectively.

These electrodes, as negative electrodes, were combined with sintered type nickel hydroxide electrodes to obtain batteries of standard AA size. These batteries equipped with the electrode "E1-E6", "CE1-CE6" and "CE7-CE12" were prepared and identified as "BA1-BA6" of the present invention, and "BC1-BC6" and "BC7-BC12" of the comparative examples. These batteries included 30 wt % KOH as an alkaline electrolyte and polyamide unwoven fabric as a separator.

TEST 2—1

In TEST 2—1, the relationships between charging time and internal pressure for the batteries "BA1-BA6", "BC1-BC6" and "BC7-BC12" were determined. Typical results of the test are shown in FIGS. 5-10, which show rapid charging characteristics of the batteries. The internal pressure of the battery was measured continuously by charging at a 1 C rate.

According to FIG. 5 to FIG. 10, the batteries "BC1-BC6" equipped with the electrodes "CE1-CE6" without treatment of steam rapidly increase the internal pressure of the batteries. The batteries "BA1-BA6" equipped with the electrodes "E1-E6" of the present invention which were treated by steam with an organic material hardly increase the internal pressure of the batteries and have superior oxygen consumption characteristics. On the other hand, the batteries "BC7-BC12" equipped with the electrodes "CE7-CE12" have superior oxygen consumption characteristics compared to the batteries "BC1-BC6". However, compared to the batteries BA1-BA6, the batteries BC7-BC12 are inferior in their consumption of oxygen gas, thus rapid increases of internal pressure are observed.

Third Experiment

In a third experiment, using a large size hydrogen-absorbing alloy granules and small size hydrogen-absorbing alloy granules with binder, thicknesses of a thin film of binder formed on an hydrogen-absorbing alloy granule are different depending upon the size. It is known that the thickness of the large size granules is thinner than that of the small size granules because of a difference caused by their surface tension curvatures. Using the above hydrogen-absorbing alloys for the negative electrode in an alkaline battery, the thin film is dissolved and removed by water included in an alkaline electrolyte; the hydrogen-absorbing alloy is thereby exposed. In the present invention, a part of the thin film is so thin that dilution and removal of the binder are facilitated. Therefore, the characteristics of the battery, namely, the oxygen gas consumption characteristics, are improved. The size of the hydrogen-absorbing alloy granule may be set ranging from a thickness of a layer of the hydrogen-absorbing paste to a half of the thickness.

{First Embodiment 3—1}

Figure 11:
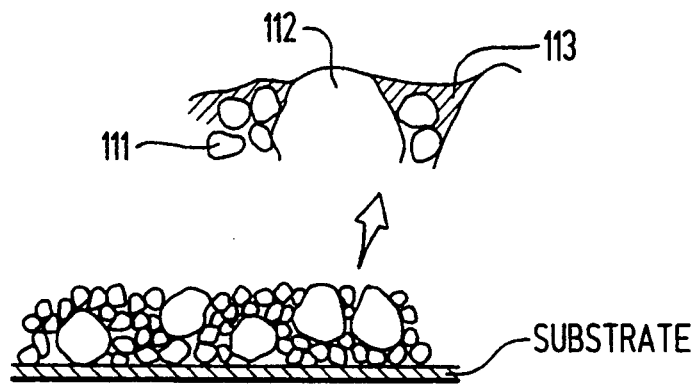
FIG. 11 is an illustration of the hydrogen-absorbing alloy granules, a binder and a conductive substrate.
Figure 12:
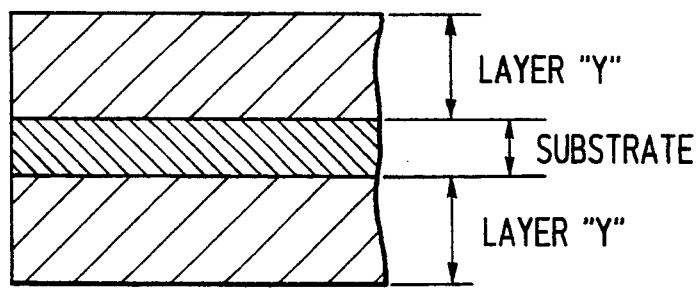
FIG. 12 is a cross-section of the hydrogen-absorbing alloy electrode.

First, Mm (Misch metal), nickel (Ni), cobalt (Co), manganese (Mn) and aluminum (Al) are measured, mixed in a ratio of 1:3.2:1:0.6:0.2, and melted in a high frequency furnace under an inert (argon) atmosphere. The melt is cooled, and a hydrogen-absorbing alloy bulk is thereby obtained. The alloy is represented by the formula $MmNi_{3.2}CoMn_{0.6}Al_{0.2}$. The hydrogen-absorbing alloy bulk is crushed and classified into granules less than 50 $\mu$m size (second granules) and about 100 $\mu$m size (first granules), thus two kinds of hydrogen-absorbing alloy granules are prepared. Next, after mixing less than 50 $\mu$m size granules and 100 $\mu$m size granules at a mixture ratio of 95:5, two kinds of granules are mixed and kneaded with polyethyleneoxide (PEO) as a water-soluble binder to obtain a paste. The paste is coated onto both sides of a punched nickel metal plate as a conductive substrate, and dried; an electrode plate is thereby produced. As shown in FIG. 11, a thickness of a binder film 113 on the large size granules 112 is thinner than that on small size granules 111. FIG. 12 shows an electrode according to the invention composed of two layers of hydrogen-absorbing alloy granules carried by a substrate. As to a range of the large size granules of the hydrogen-absorbing alloy shown in FIG. 12, when a thickness of a layer composed of hydrogen-absorbing alloy granules is represented by "Y" and a diameter of the large size granules of the hydrogen-absorbing alloy is represented by "P". Thus, the relations between "Y" and "P" are represented by the equation $Y/2<P<Y$, which was obtained empirically. The hydrogen-absorbing alloy electrode so produced is identified as electrode "B1".

{Second Embodiment 3—2}

In a second embodiment 3—2, small granules of a diameter not more than 50 $\mu$m and large granules having an about 100 $\mu$m diameter are mixed at a weight ratio of 90:10, and a mixture is used. Except for the mixture, the conditions are the same as in the first embodiment. In the second embodiment 3—2, an electrode "B2" of the present invention is prepared.

{Third Embodiment 3—3}

In a third embodiment 3—3, small granules of a diameter not more than 50 $\mu$m and large granules having an about 100 $\mu$m diameter are mixed at a weight ratio of 80:20, and a mixture is used. Except for the mixture, the conditions are the same as in the first embodiment 3—1. In the third embodiment 3—3, an electrode "B3" of the present invention is prepared.

{Comparative Example}

In a comparative example, as for the hydrogen-absorbing alloy granules, small granules of a diameter not more than 50 $\mu$m are used; the other condition are the same as in the first embodiment 3—1. In the comparative embodiment, an electrode "Y" is prepared.

These electrodes "B1", "B2", "B3" and "Y", as negative electrodes, are combined with nickel electrodes to form hermetic single cells. These cells, equipped with the electrodes "B1", "B2", "B3" and "Y", are called "b1", "b2", "b3" of the present inventions and "y" of the comparative example. These cells include a separator impregnated with 30 wt % KOH as an alkaline electrolyte.

TEST 3—1

Figure 13:
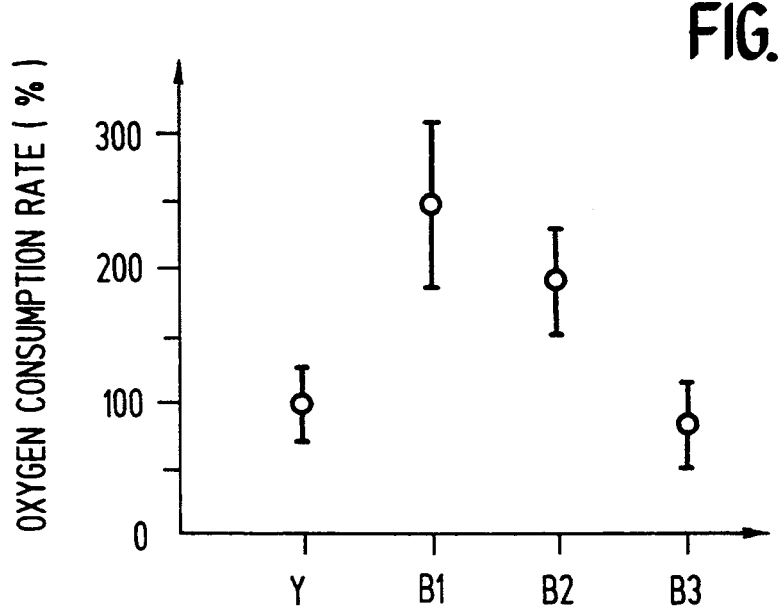
FIG. 13 is a graph showing the relationship between each electrode and an oxygen gas consumption rate in accordance with the present invention.

In TEST 3—1, the oxygen consumption rate of the cells of "b1", "b2", "b3" and "y" was measured. After charging each cell at 30 mA current for 10 hours to reach charging depth of 72%, oxygen gas filled the hermetic containers of the cells. The internal pressure of the hermetic containers was measured; thus, an oxygen consumption rate was calculated. In FIG. 13, results are shown relatively compared to the comparative example represented by 100 rates. From the results in FIG. 13, the electrodes "B1", "B2" and "B3" of the present invention have superior oxygen gas consumption characteristics.

TEST 3—2

In TEST 3—2, the above electrodes "B1", "B2", "B3" and "Y" were combined with sintered type nickel hydroxide electrodes for a positive electrode to form batteries. These batteries, equipped with the electrodes "B1", "B2", "B3" and "Y", were designated "B1b", "B2b", "B3b" of the present inventions and "Yb" of the comparative example. These cells included a separator impregnated with 30 wt % KOH as an alkaline electrolyte.

Figure 14:
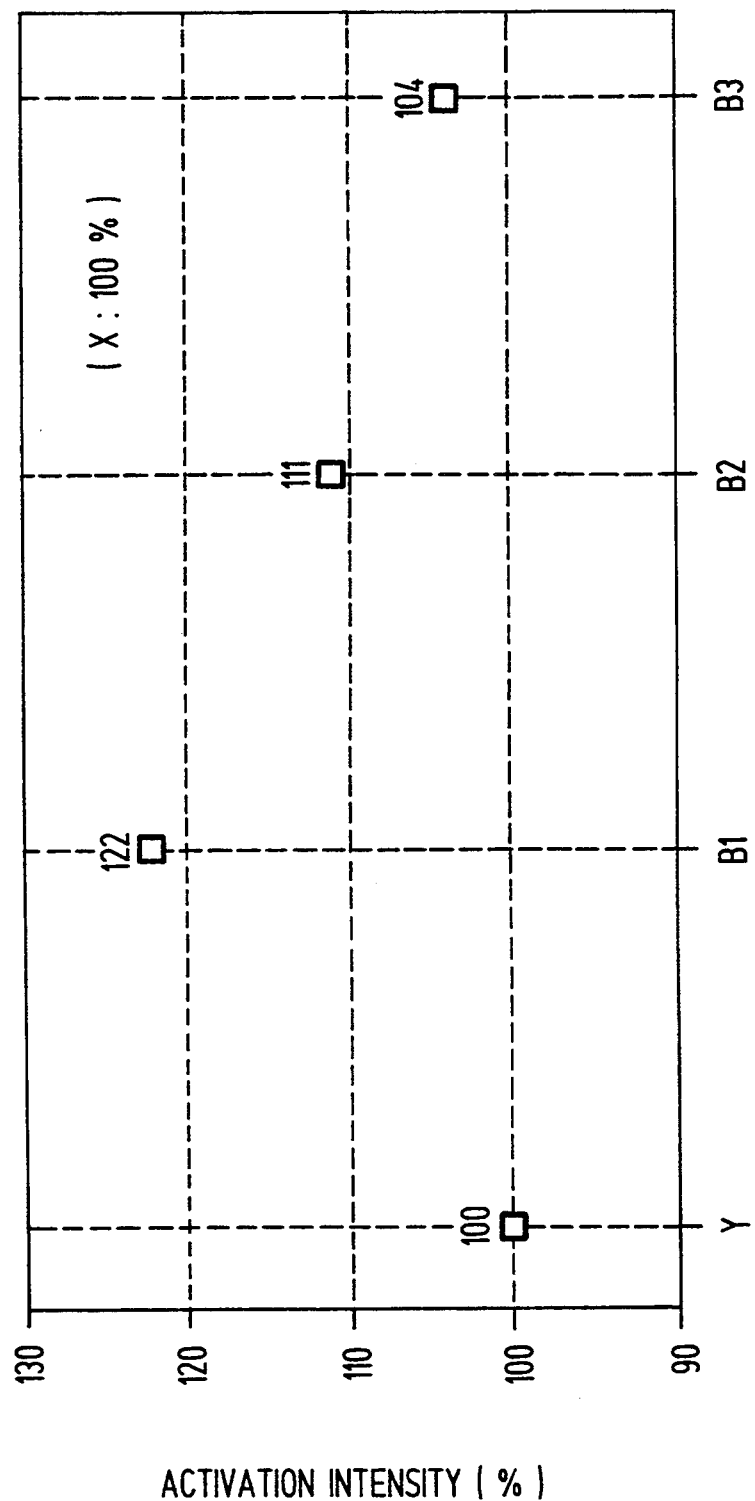
FIG. 14 is a graph showing the relationship between each electrode and an activation intensity.

In TEST 3—2, an initial activity of those electrodes "B1", "B2", "B3" and "Y" was measured. Typical conditions were set as follows. After charging a battery at a rate of 50 mA/g for 8 hours, each battery was discharged at a rate of 50 mA/g and at a rate of 200 mA/g. In TEST 3—2, discharging at the rate of 50 mA/g, a capacity is set C50 and discharging at the rate of 200 mA/g a capacity is set C200 , and a value of C50/C200X100(%) is calculated. When the value of C50/C200X100(%) becomes larger, the initial activity of the electrode becomes higher. In FIG. 14, the vertical axis relatively represents a degree of the initial activity by the comparative electrode "Y" setting 100. According to FIG. 14, the electrodes "B1", "B2" and "B3" of the present invention have superior characteristics of the initial characteristics compared to the electrode "Y" of the comparative example.

TEST 3—3

In TEST 3—3, the electrodes "B1", "B2", "B3" and "Y" for negative electrodes are combined with sintered type nickel hydroxide electrode for a positive electrode to obtain the battery shown in FIG. 1. These batteries equipped with the electrode "B1", "B2", "B3" and "Y", are designated "b1", "b2", "b3" of the present inventions, and "y" of the comparative example. These batteries include a separator impregnated with 30 wt % KOH as an alkaline electrolyte.

Figure 15:
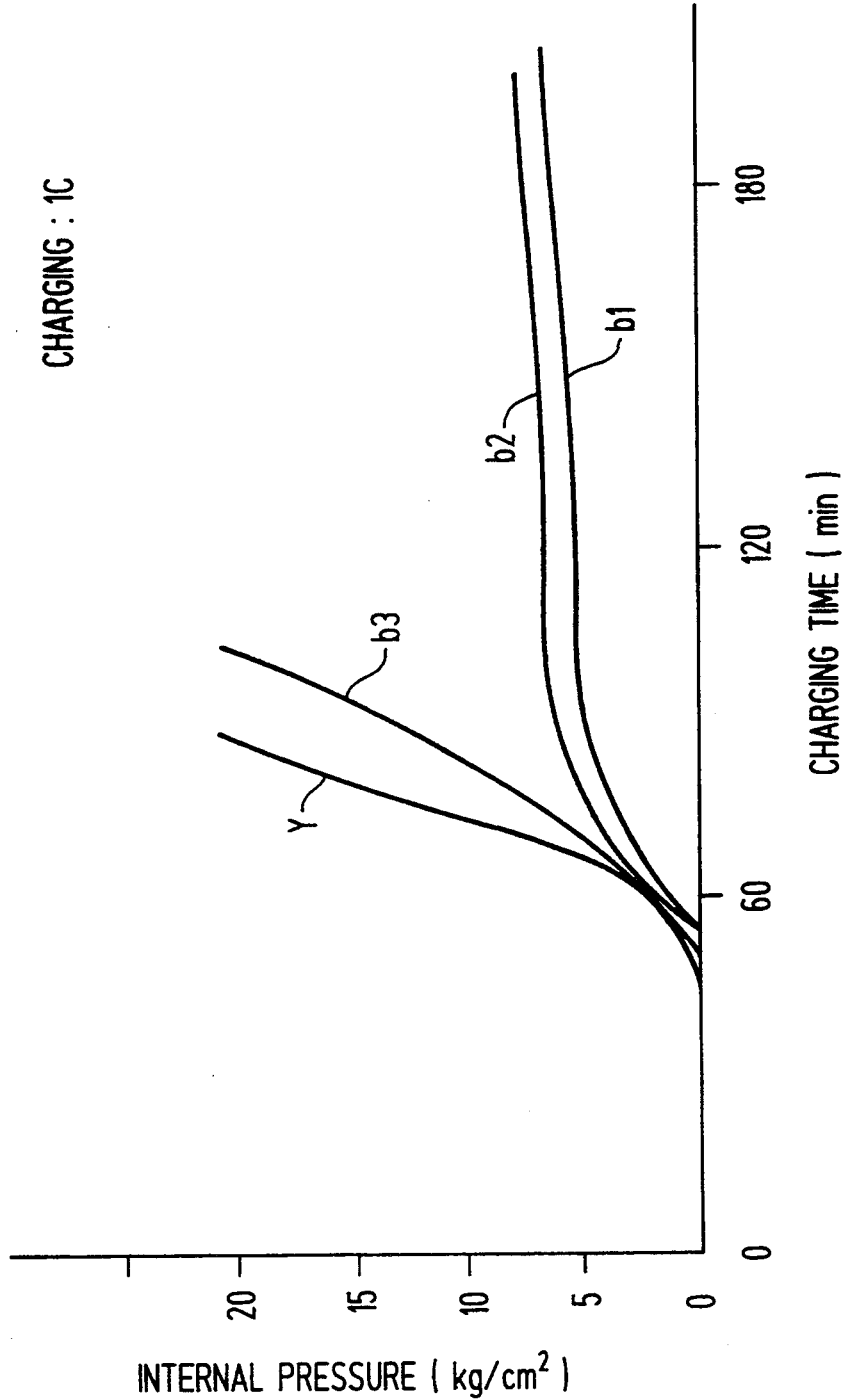
FIG. 15 is a graph showing the relationship between the charging time and the internal pressure in a battery of the present invention.

In TEST 3—3, an internal pressure of the batteries "b1", "b2", "b3" and "y" is measured. Typical conditions were set as follows. After charging battery at a 1 C rate continuously, each internal pressure of the battery is measured. According to FIG. 15, the batteries "b1", "b2" and "b3" of the present invention have superior oxygen gas consumption characteristics compared to the battery "y" of the comparative example, thus an increase of the internal pressure in the battery is prevented.

Judging from above TEST 3—1, TEST 3—2 and TEST 3—3, an amount of the large size granules in the hydrogen-absorbing alloy may be preferred ranging from about 5 part weight to about 20 parts weight. The reason for this is based on the fact that use of too many of the large size granules causes reduction to fill up volume in a negative electrode, and cause decrease of real reaction area on the hydrogen-absorbing alloy granules.

Low temperature characteristics, although not shown in this specification, are also improved by the conditions of the third experiment.

As shown in the first and second experiments, the steam spraying treatment may be combined with the third experiment. As a result of this combination, the advantage of removing binder is improved.

While the description above refers to particular embodiments of the present invention, it will be understood that many modifications may be made without departing from the spirit thereof. The accompany claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of manufacturing a hydrogen-absorbing alloy electrode comprising the steps of:
    mixing hydrogen-absorbing alloy granules with a binder to form a layer;
    coating said layer onto a conductive substrate to produce an electrode plate; and
    removing a part of said binder from a surface of said electrode plate to expose a part of said hydrogen-absorbing alloy granules in said surface to an electrolyte.

2. A method of manufacturing a hydrogen-absorbing alloy electrode according to claim 1, wherein said layer has a predetermined thickness and said hydrogen-absorbing alloy granules includes large size granules having a maximum diameter larger than half the thickness of said layer but smaller than the thickness of said layer.

3. A method of manufacturing a hydrogen-absorbing alloy electrode according to claim 1, wherein said binder includes an organic soluble material, and said binder adjacent to said surface is removed by an organic solvent.

4. A method of manufacturing a hydrogen-absorbing alloy electrode according to claim 1, wherein said binder includes a water soluble material, and said binder adjacent to said surface is removed by water.

5. A method of manufacturing a hydrogen-absorbing alloy electrode according to claim 4, wherein said water soluble material is selected from a group consisting of polyethylene oxide (PEO), polyvinyl pyrrolidone (PVP), polyvinyl alcohol (PVA), polyvinyl butyral (PVB) and hydroxypropyl cellulose (HPC).

6. A method of manufacturing a hydrogen-absorbing alloy electrode according to claim 4, wherein said water includes an organic material for resolving said binder.

7. A method of manufacturing a hydrogen-absorbing alloy electrode according to claim 6, wherein said organic material is selected from a group consisting of amine, ketone, fatty acid, ether and alcohol.

8. A method of manufacturing a hydrogen-absorbing alloy electrode according to claim 6, wherein said water includes said organic material by an amount ranging 0.1 wt % to 20 wt %.

9. A method of manufacturing a hydrogen-absorbing alloy electrode comprising the steps of:
    mixing hydrogen-absorbing alloy granules with a binder to form a layer, said binder including one type of photoresist;
    coating said layer onto a conductive substrate to provide an electrode plate;
    irradiating said electrode plate by ultraviolet radiation; and
    removing a part of said binder from a surface of said electrode plate to expose a part of said hydrogen-absorbing alloy granules in said surface to an electrolyte.

10. A method of manufacturing a hydrogen-absorbing alloy electrode according to claim 9, wherein said layer has a thickness and said hydrogen-absorbing alloy granules includes large size granules having a maximum diameter larger than half the thickness of said layer but smaller than the thickness of said layer.

11. A method of manufacturing a hydrogen-absorbing alloy electrode according to claim 9, wherein said binder is defined by one of a positive type photoresist and a negative type photoresist.

12. A method of manufacturing a hydrogen-absorbing alloy electrode according to claim 9, wherein said binder includes 100% of said one type of photoresist.

13. A method of manufacturing a hydrogen-absorbing alloy electrode according to claim 9, wherein said step of removing is carried out by a dry ashing method.

14. A method of manufacturing a hydrogen-absorbing alloy electrode according to claim 9, wherein said binder is removed by a developer for said one type of photoresist.

15. A method of manufacturing a hydrogen-absorbing alloy electrode according to claim 12, wherein an amount ranging from 20 wt % to 80 wt % of said one type of photoresist remains in said layer after said removing step.

16. A method of manufacturing a hydrogen-absorbing alloy electrode comprising the steps of:

mixing hydrogen-absorbing alloy granules with a binder selected from a group consisting of polyethylene oxide (PEO), polyvinyl pyrrolidone (PVP), polyvinyl alcohol (PVA), polyvinyl butyral (PVB) and hydroxypropyl cellulose (HPC) to obtain a layer;

coating said layer onto a conductive substrate to provide an electrode plate;

subjecting said electrode plate to water, said water including an organic material selected from a group consisting of amine, ketone, fatty acid, ether and alcohol; and drying said electrode plate; wherein said hydrogen-absorbing alloy granules in said surface is exposed to an electrolyte.

17. A method of manufacturing a hydrogen-absorbing alloy electrode according to claim 16, wherein said layer has a thickness and said hydrogen-absorbing alloy granules includes large size granules having a maximum diameter larger than half the thickness of said layer but smaller than the thickness of said layer.

18. A method of manufacturing a hydrogen-absorbing alloy electrode according to 16, wherein said water includes said organic material by an amount ranging from 0.1 wt % to 20 wt %.

* * * * *